H. K. McCLURE.
SHOCK ABSORBER.
APPLICATION FILED SEPT. 10, 1913.
1,122,292.
Patented Dec. 29, 1914.
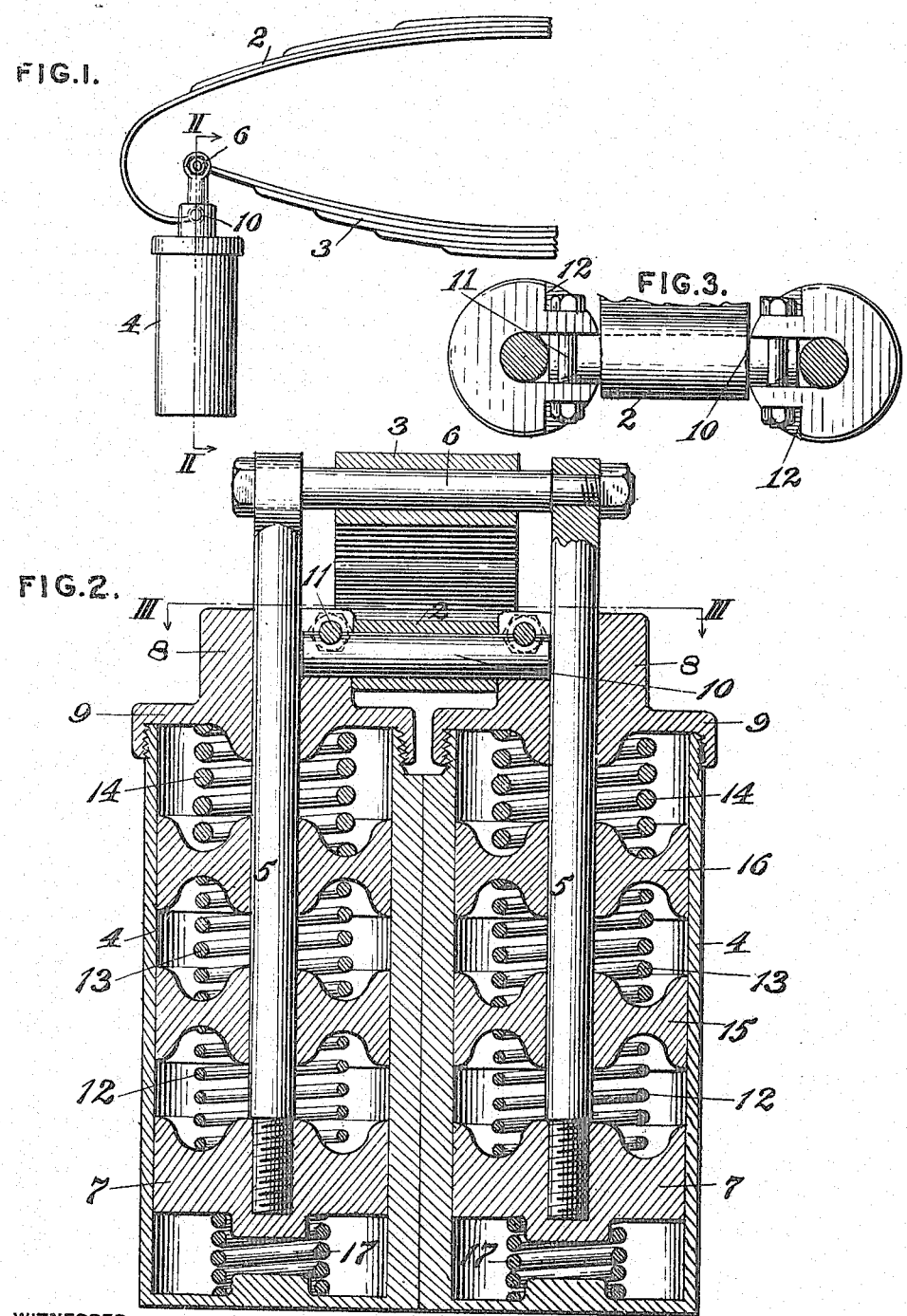
WITNESSES
INVENTOR
Harry K. McClure
by C. M. Clark
his attorney

UNITED STATES PATENT OFFICE.

HARRY K. McCLURE, OF ELK LICK, PENNSYLVANIA.

SHOCK-ABSORBER.

1,122,292.　　　　　Specification of Letters Patent.　　Patented Dec. 29, 1914.

Application filed September 10, 1913. Serial No. 789,079.

*To all whom it may concern:*

Be it known that I, HARRY K. MCCLURE, a citizen of the United States, residing at Elk Lick, in the county of Somerset and State of Pennsylvania, have invented certain new and useful Improvements in Shock-Absorbers, of which the following is a specification.

My invention consists of an improvement in shock absorbers of the class designed for use with the springs of an automobile or other vehicle, and has for its object to provide, in a device of this class, means for cumulatively absorbing the shock consisting of a series of springs of varying strength adapted to act successively, as hereinafter more fully described.

In the drawings, which show one preferred form of the device,—Figure 1 is a view of the shock absorber in side elevation connected with the terminals of the vehicle springs. Fig. 2 is an enlarged vertical sectional view, taken on the line 11. 11 of Fig. 1. Fig. 3 is a horizontal sectional view, taken on the line 111. 111. of Fig. 2.

In shock absorbers of this type, the operative mechanism is connected with the terminals of the main springs 2 and 3, between the axle and the vehicle body, and is designed to provide, between the spring terminals, supplemental means for absorbing the shock incidental to travel over rough roads and under varying loads. The strength of the springs 2 and 3, being normally uniform and capable of absorbing the maximum shocks or vibrations of a vehicle, do not, however, absorb such shocks with sufficient quickness to prevent vibration, and do not absorb the rebounding shocks. These are designed to be eliminated or absorbed by the present invention, promptly and gradually. To that end I provide a casing, or preferably a pair of casings, 4, 4, which may be conveniently cylindrical in form, and within each of said casings is a spindle or rod, 5, 5, adapted to be connected by a cross bolt or pin 6, passing through their upper ends and secured therein in any suitable manner, with the terminal of the lower spring 3, as will be readily understood.

The lower ends of spindles 5 are provided with heads or plungers 7, fixedly secured to the spindles by threaded extensions thereof, the heads 7 being freely movable within the casings 4. Between the lower ends of heads 7 and the bottom of the casings, is preferaby inserted a cushioning spring 17 of any desired strength, and operating to cushion the plungers 7 against the bottoms of the casings, to absorb rebounding shocks.

Spindles 5 pass upwardly through extended hubs 8 of closing caps 9, which are secured to the upper ends of casings 4 by suitable means, as screw thread connections therewith. Main spring 2 is connected with the casings by means of a transverse bolt or pin 10 extending inwardly through the hubs 8 of caps 9, at each end and preferably secured therein by suitable means, as transverse bolts 11, the hubs 8 being recessed, as at 12, to provide clearance for the bolt heads and nuts, as shown in Fig. 3.

For the purpose of cumulatively absorbing the shocks, in connection with movement of springs 2 and 3, the terminals of said springs, tending to alternately move in opposite directions under the shocks of the load and rebound thereof, the spindles 5, connected with lower spring 3 as described, are designed to successively compress a series of helical springs 12 and 13 and 14, of successively increasing strength and resistance in the order named, in connection with the opposing casing, and as shown in Fig. 2. The lowermost of said springs 12, in each casing is inserted between the upper face of plunger 7 and a similar plunger 15, slidably mounted on spindle 5 and within the casing 4 for free movement with relation to said spring 12 and the next spring 13. Likewise, the next spring 13 is inserted between plunger 15 and a similar plunger 16, between which and the upper ends of the casings are inserted the springs 14. Plungers 7, 15 and 16 are annularly recessed on their faces for reception of the ends of the several springs, as clearly shown, whereby they are maintained in centralized operating position.

It will be understood, of course, that the number of springs and their degree of strength may be varied, more or less to suit the conditions of use, weight of the vehicle and its load, etc., within the principle of the invention, which is designed to operate, in a structure of this type, through series of springs of varying strength and resisting force.

In operation, the initial shocks will be absorbed by the weakest spring 12, which in cases of a light vehicle or a light load, may be sufficient. The successively stronger springs 13 and 14 do not come into action, due to their resisting opposition, until the weakest springs 12 have been compressed. Thereupon the shock, having been partly absorbed by said weakest springs, the next stronger springs 13 are compressed, either partially or wholly, and if the shock is still not entirely absorbed, the strongest springs 14 are then compressed, thereby completely absorbing the shocks cumulatively. Upon the termination of the load action and the succeeding rebound, the action through the absorber being then in the reverse direction, the several working parts will resume their normal position, due to the free action of the several heads 7, 15, and 16, and the expansive action of the several springs, the rebound being absorbed by springs 17.

The device as thus constructed is comparatively simple, and economical; it is very compact and capable of application to the standard springs at present employed, and will continuously perform its intended functions under the varying conditions incidental to the use of the vehicle, without impairment or liability to get out of order.

It will be understood that the invention may be changed or varied in design, construction, details, or otherwise by the skilled mechanic, and that it may be applied to other uses where similar conditions exist, but all such changes are to be considered as within the scope of the following claims.

What I claim is:

1. A shock absorber consisting of a casing having means at one end for connecting it to a vehicle spring, a centrally arranged spindle within the casing having means for connecting it beyond the casing to a coacting vehicle spring, an abutment within the casing secured to the opposite end of said spindle, a plurality of springs of varying strength surrounding said spindle within the casing between said abutment and the vehicle-spring-attaching end of the casing, a separating abutment surrounding and slidably engaging the spindle between said springs, and a supplemental cushioning spring between said abutment and the other end of the casing, substantially as set forth.

2. In a shock absorber, the combination of two cylindrical casings having terminal hubbed caps, a vehicle spring bolt secured in the inner portions of the cap hubs, a centrally arranged spindle extending longitudinally within each cylinder, a vehicle spring bolt connecting the ends of the centrally arranged spindles beyond the casing, an abutment fixedly secured to the inner end of each spindle, one or more floating abutments slidably mounted on each spindle, a plurality of springs of varying strength surrounding the spindle within each casing, said springs engaging the spindle abutment, floating abutment, and terminal cap respectively, and a supplemental spring between the other side of each spindle abutment and the adjacent inner end of its casing, substantially as set forth.

3. In a shock absorber, in combination, a pair of cylindrical casings each having a removable cap at one end provided with a projecting hub and closed at the other end, a vehicle spring bolt engaging the inner portions of each hub and fixedly held therein, a pair of centrally arranged spindles, each extending through said cap into each cylinder and provided with a fixedly secured abutment at its inner end, a vehicle spring bolt connecting the outer ends of said spindles, a plurality of floating abutments slidably mounted on each spindle within each casing, a plurality of springs of varying strength surrounding each spindle within each casing, said springs bearing against the spindle abutment, the floating abutments, and the end of each casing respectively, and a supplemental cushioning spring between the other side of each spindle abutment and the adjacent inner end of its casing, substantially as set forth.

In testimony whereof I hereunto affix my signature in the presence of two witnesses.

HARRY K. McCLURE.

Wtnesses:
H. HAY,
J. H. McCLURE.